US009560581B2

United States Patent
Xing et al.

(10) Patent No.: US 9,560,581 B2
(45) Date of Patent: Jan. 31, 2017

(54) MOBILE DEVICE WITH IMPROVED SERVICE ACQUISITION WITH EARLY MCC DETECTION

(71) Applicant: Apple Inc., Cupertino, CA (US)

(72) Inventors: Longda Xing, San Jose, CA (US); Madhusudan Chaudhary, Campbell, CA (US); Qin Zhang, Mountain View, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/720,628

(22) Filed: May 22, 2015

(65) Prior Publication Data

US 2016/0345246 A1  Nov. 24, 2016

(51) Int. Cl.
*H04W 48/16* (2009.01)
*H04W 8/00* (2009.01)

(52) U.S. Cl.
CPC ............ *H04W 48/16* (2013.01); *H04W 8/005* (2013.01)

(58) Field of Classification Search
CPC ...... H04W 48/16; H04W 8/005; H04W 4/021; H04W 24/02; H04W 48/18; H04W 4/02; H04W 68/005; H04W 76/048; H04W 84/042; H04W 88/06; H04W 8/02; G04G 9/0076
See application file for complete search history.

(56) References Cited

U.S. PATENT DOCUMENTS

| 8,144,725 | B2 | 3/2012 | Bienas et al. | |
|---|---|---|---|---|
| 8,204,499 | B2 | 6/2012 | Rahman et al. | |
| 8,315,625 | B2 | 11/2012 | Kim et al. | |
| 8,670,761 | B2 | 3/2014 | Ramkull et al. | |
| 8,965,917 | B2 | 2/2015 | Edara | |
| 9,125,146 | B1 * | 9/2015 | Edara | H04W 48/18 |
| 2008/0259942 | A1 * | 10/2008 | Skog | H04L 61/106 370/401 |
| 2009/0011758 | A1 * | 1/2009 | Aoki | H04W 4/02 455/432.1 |
| 2009/0258645 | A1 * | 10/2009 | Ramkull | H04W 48/16 455/434 |
| 2010/0075711 | A1 * | 3/2010 | Tsubouchi | H04W 52/0251 455/553.1 |
| 2012/0083268 | A1 * | 4/2012 | Lung | H04W 48/16 455/434 |
| 2012/0225669 | A1 * | 9/2012 | Brandt | H04H 20/61 455/456.1 |

(Continued)

*Primary Examiner* — Hirdepal Singh
(74) *Attorney, Agent, or Firm* — Meyertons Hood Kivlin Kowert & Goetzel, P.C.; Jeffrey C. Hood

(57) ABSTRACT

Apparatuses, systems, and methods for user equipment (UE) devices to determine that it does not have cellular service and perform one or more searches for a mobile country code (MCC). The searches may include searches based on cellular modes, radio access technologies (RATs), and/or cellular bands. The UE may determine the MCC based on results of the one or more searches and perform a targeted service acquisition search based on, and limited by, the MCC. The MCC may be associated with one or more cellular modes, RATs, and/or cellular bands via a data structure that maps the MCC to the one or more cellular modes, RATs, and/or cellular bands. The targeted service acquisition search may include at least one RAT and one or more cellular bands within the at least one RAT associated with the MCC.

20 Claims, 4 Drawing Sheets

(56) References Cited

U.S. PATENT DOCUMENTS

| | | | | |
|---|---|---|---|---|
| 2015/0004966 A1* | 1/2015 | Ayleni | ............. | H04W 36/0005 455/433 |
| 2015/0056985 A1* | 2/2015 | Swaminathan | ....... | H04W 88/06 455/432.1 |
| 2015/0304918 A1* | 10/2015 | Jung | .................... | H04W 48/20 455/436 |

* cited by examiner

MOBILE DEVICE WITH IMPROVED SERVICE ACQUISITION WITH EARLY MCC DETECTION

FIELD

The present application relates to wireless devices, and more particularly to an apparatus, system, and method for wireless devices to perform a service acquisition with early MCC detection.

DESCRIPTION OF THE RELATED ART

Wireless communication systems are rapidly growing in usage. Further, wireless communication technology has evolved from voice-only communications to also include the transmission of data, such as Internet and multimedia content. In certain scenarios a wireless device may use a search algorithm to acquire service with a wireless network. These search algorithms may burden device resources. Thus, improvements in the field are desired.

SUMMARY

Embodiments are presented herein of methods for wireless devices to more efficiently scan frequency bands for potential base stations and of devices configured to implement these methods. Embodiments relate to a user equipment (UE) device having at least one antenna for performing wireless communications, a radio, and a processing element coupled to the radio. The UE may perform voice and/or data communications, as well as the methods described herein.

According to the techniques described herein, a UE may determine that it does not have cellular service and perform one or more searches for a mobile country code (MCC). The searches may include searches based on cellular modes (or systems), radio access technologies (RATs), and/or cellular bands. The UE may determine the MCC based on results of the one or more searches and perform a targeted service acquisition search based on, and limited by, the MCC. The MCC may be associated with one or more cellular modes, RATs, and/or cellular bands. The UE may include a data structure that maps the MCC to the one or more cellular modes, RATs, and/or cellular bands. The targeted service acquisition search may include at least one RAT searched and one or more cellular bands searched within the at least one RAT. In other words, the targeted service acquisition search may include at least one RAT associated with the MCC via the data structure and one or more cellular bands within the at least one RAT.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
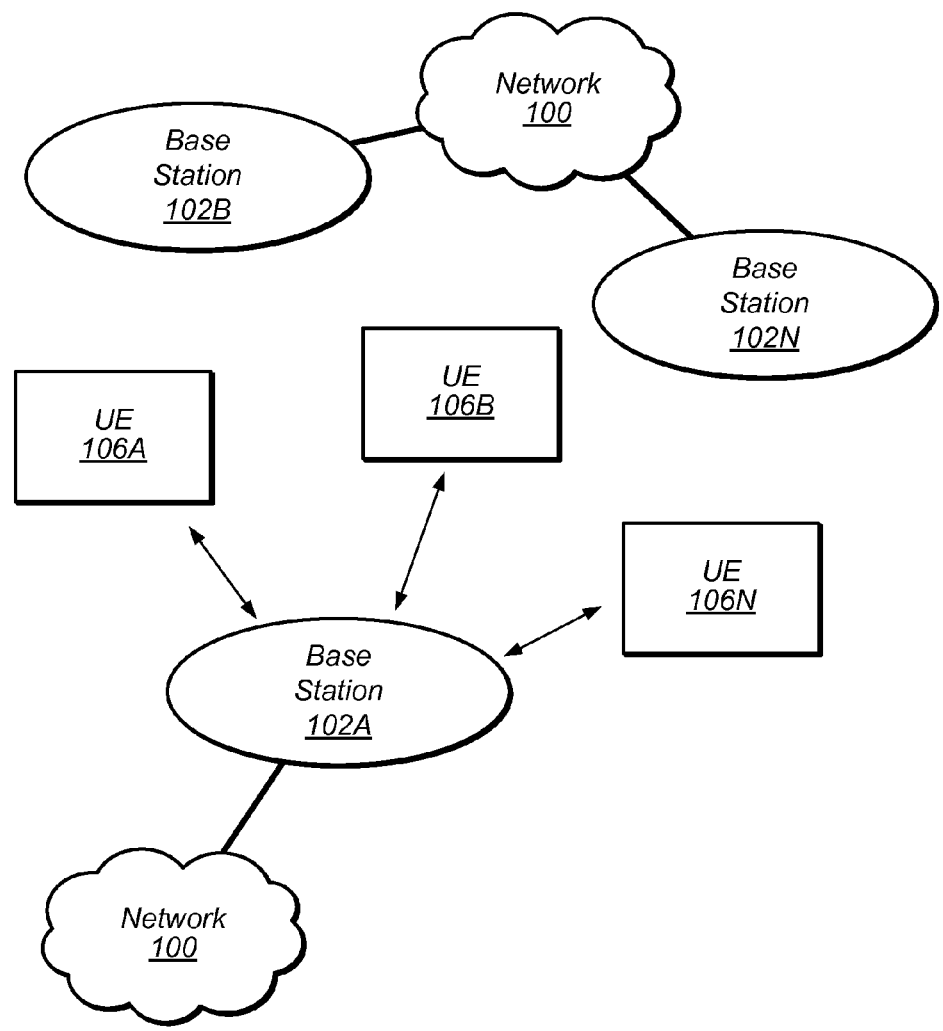
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured To—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits. Various components may be described as performing a task or tasks, for convenience in the description. Such descriptions should be interpreted as including the phrase "configured to." Reciting a component that is configured to perform one or more tasks is expressly intended not to invoke 35 U.S.C. §112(f) interpretation for that component.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Figure 2:
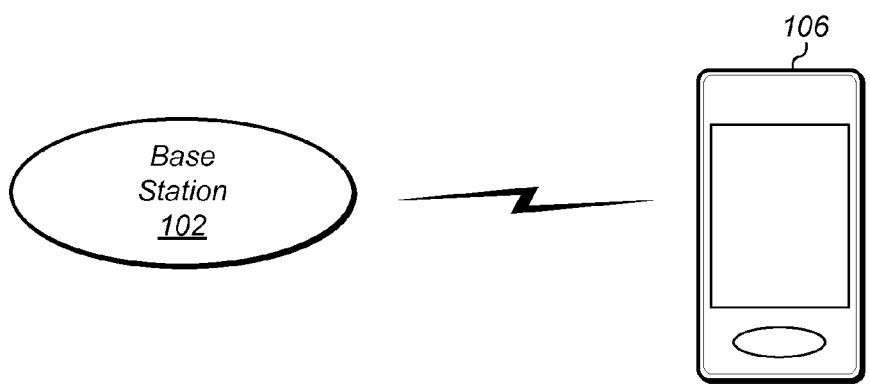
FIG. 2 illustrates a base station (BS) in communication with a user equipment (UE) device according to some embodiments.

FIGS. 1 and 2—Communication System

FIG. 1 illustrates a simplified example wireless communication system, according to embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
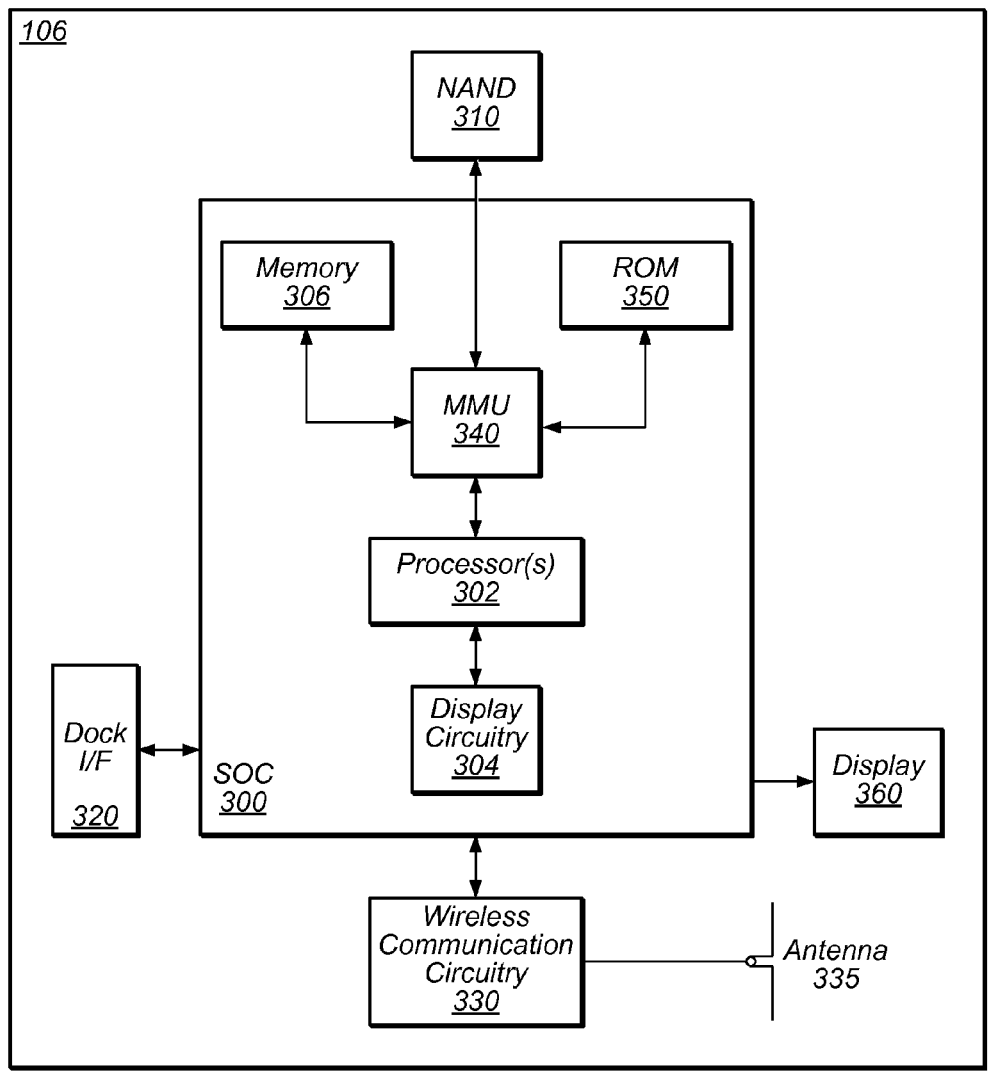
FIG. 3 illustrates an example block diagram of a UE according to some embodiments.

FIG. 3—Block Diagram of a UE

FIG. 3 illustrates an example block diagram of a UE 106, according to embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 106 may include hardware and software components for implementing features for performing more efficient cellular base station scanning, such as those described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein.

Figure 4:
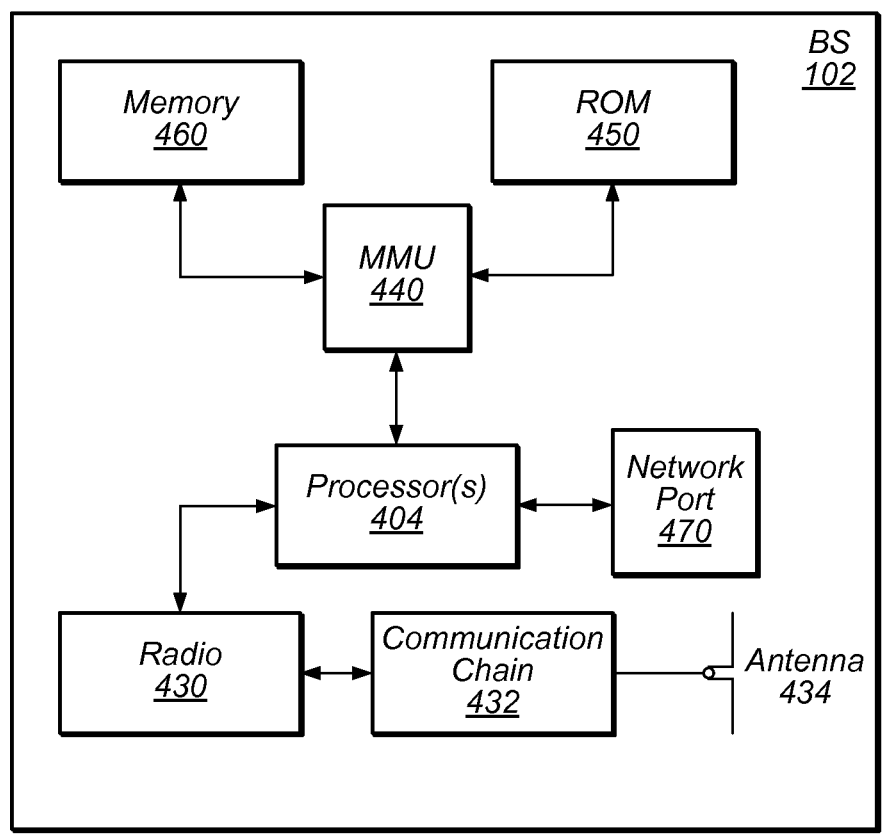
FIG. 4 illustrates an example block diagram of a BS according to some embodiments.

FIG. 4—Block Diagram of a Base Station

FIG. 4 illustrates an example block diagram of a base station 102, according to embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Background—Service Acquisition

In some existing implementations, a UE may need to acquire service (i.e., locate a network) under various conditions such as powering up, when switching back from an airplane mode (e.g., when turning a radio back on), during out of service (00S) recovery, or during a SIM hot swap (e.g., exchanging a SIM of the UE while still powered), among other scenarios. In such scenarios, the UE may be home or roaming and the mobile country code (MCC) may not be known. Delay in acquiring service may result in reduced performance since service acquisition time (i.e., locating a network) is an important key performance indicator (KPI) for system selection and is determined by at least two factors: device capability and searching algorithm.

Current UEs (or mobile devices) may support multiple radio access technologies (RATs), bands, and modes of operation. For example, a UE may support 3GPP RATs such as GSM, UMTS (associated with, for example, WCDMA or TD-SCDMA air interfaces), LTE, and LTE-Advanced (LTE-A). Additionally a UE may support 3GPP2 RATs such as CDMA2000 (e.g., 1×RTT, 1×EV-DO, HRPD, eHRPD), etc. Additionally, a multi-mode UE may support both 3GPP and 3GPP2 RATs. Additionally, a UE may support multiple frequency bands for each RAT, e.g., 4 GSM bands, 5 WCDMA bands, 2 TD-SCDMA bands, 5 CDMA/DO bands, and over 10 or even 20 LTE bands. However, not all RATs and/or frequency bands are deployed in a particular region. For example, CDMA is not deployed in much or all of Europe, and TD-SCDMA may only be deployed in China and only for CMCC. However, in the United States, both 3GPP and 3GPP2 are deployed, although not necessarily across the entire country. Thus, searching for a service (network) can leverage a search of multiple capabilities of the UE—operating mode, RAT, and frequency band—to determine which service the UE should acquire.

Note that networks may be identified via a Public Land Mobile Network Identity (PLMN-ID). The PLMN-ID may include an MCC and a two or three digit mobile network code (MNC). For example, the MCC for the United Kingdom is 234, the MCC for China is 460, and the MCC for the United States is 310.

In some embodiments, the UE includes a mobile country code (MCC) detection algorithm such that a UE may target its network search in terms of which mode (3GPP or 3GPP2), which system/PLMN to select, and which RAT/band/channel to scan in order to acquire service. Thus the framework described herein can be used to reduce the service acquisition times in various scenarios, as described further below.

Figure 5:
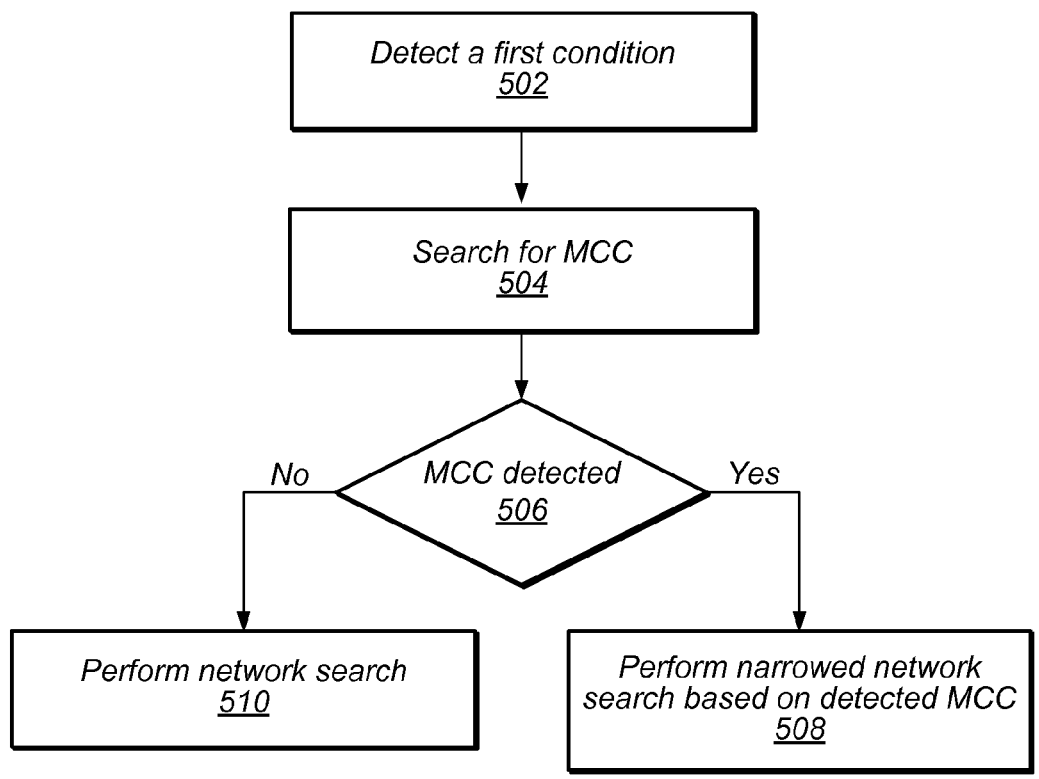
FIG. 5 is a flowchart diagram illustrating a method performed by a UE for more efficiently performing a service acquisition search according to some embodiments.

FIG. 5—Flowchart Diagram

FIG. 5 is a flowchart diagram illustrating a method performed by a UE for more efficiently performing a service acquisition search according to some embodiments. This method may be used in various types of cellular communication systems across any of a variety of cellular technologies. In addition, the method shown in FIG. 5 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 502 the UE may detect a first condition. Detection of the first condition may indicate that the UE does not currently have service. Thus, the UE may need to perform a service acquisition scan. In other words, the UE may need to locate a network. The first condition may be any of a power up condition, a switch back from an airplane mode (e.g., turning a radio used for cellular communications back on), an out of service (OOS) recovery, or a SIM hot swap (e.g., exchange of a SIM of the UE while still powered), among other conditions.

At 504, prior to performance of a service acquisition scan, the UE may perform one or more of searches (e.g., search algorithms) to detect (or determine) a mobile country code (MCC). The various methodologies for searching for an MCC are described below in further detail. According to embodiments, the UE may perform any of the below described searches concurrently (e.g., in parallel), sequentially (e.g., via a prioritization of the various algorithms/methodologies), in an interleaved manner, or in any other manner. The UE may base which search(es) to perform on the first condition. Further, the UE may base the order, sequence, or parallelism of searches to perform on the first condition. Note that the MCC search may be performed to detect the MCC and not to camp on a system or to acquire service. Thus, the UE may remain in receive (RX) mode and the UE may not transmit (TX) during the MCC search. In some embodiments searches may be performed at least partially by a baseband or modem processor.

In some embodiments, an MCC search may be performed based on cellular mode (system) such as, for example, 3GPP or 3GPP2 systems. In addition, if MCC detection occurs on a 3GPP system, the UE may decode a master information block (MIB) and/or a system information block (SIB) to receive the PLMN-ID and decode the MCC. Alternatively, or in addition, if the MCC detection occurs on a 3GPP2 system, the UE may read synchronous channel information and decode a system identifier (SID) and/or a network identifier (NID) to determine the MCC. Note that in some embodiments, MCC searches on cellular systems may be performed in a sequential manner. In other words, an MCC search may be performed on one system and then another system, e.g., 3GPP then 3GPP2 or vice versa. Further, MCC searches on cellular systems may be interleaved. Thus, the UE may alternate between RATs and/or bands associated with a first cellular system and RATs and/or bands associate with second cellular system. Additionally, an MCC search for one cellular system may run in parallel (e.g., concurrently) with another MCC search for another cellular system. For example, a UE may include multiple receivers and one receiver may be operated to perform an MCC search for one cellular system while another receiver may be operated to perform an MCC search for another cellular system.

In some embodiments, an MCC search may be performed based on frequencies and/or channels stored in the UE. For example, for 3GPP, the UE may scan any of an absolute radio-frequency channel number (ARFCN), a UMTS Terrestrial Radio Access (UTRA) ARFCN (UARFCN), or an enhanced UTRA (E-UTRA) ARCFN (EARCFN) stored in the UE prior to scanning other frequencies and/or channels. As another example, for 1× (e.g., 1×RTT, 1×EV-DO) and/or CDMA, the UE may scan a most recently used (MRU) band and/or frequency list prior to scanning other frequencies and/or channels. Note that if no MCC is detected in a stored list search, the UE may perform an MCC search on other supported bands. In embodiments, if no MCC is detected in a stored list search, the UE may perform an MCC search on 3GPP RATs since 3GPP is globally deployed.

In some embodiments, an MCC search may be based on likelihood of deployment of RATs. Thus, a UE may prioritize RATs to be searched. For example, the UE may search for GSM first as it is most likely to be deployed among RATs. Additionally, the UE may determine to not search for specific RATs based on a corresponding condition. For example, a UE may determine to skip LTE bands if the UE determines that a gateway (GW) search resulted with no system found.

In some embodiments, an MCC search may include a search of RATs and/or bands. In some embodiments, the search of RATs and/or bands may be interleaved such that the interleaved search may begin with a search of multiple bands on a first RAT and may continue to search multiple bands on a second RAT before returning to the first RAT to search additional bands on the first RAT and so forth. For example, a UE may first search 900 MHz and 850 MHz bands on GSM, then search bands I and V on WCDMA, then search 800 MHz and 900 MHz bands on GSM I, then search bands II and VIII on WCDMA, and then search LTE bands. Note that this is only one example, and it is contemplated that the searches may be conducted in various sequences according to embodiments. In addition, the interleaved search may be based on stored channel/frequency lists on the UE. For example, the UE may scan a combination of a 1×MRU list, a GSM stored list, a WCDMA stored list, an LTE stored list, a GSM band, a WCDMA band, and so forth.

In some embodiments, an MCC search may include a search via non-cellular sources including, but not limited to, peer-to-peer communications, an FM radio of the UE, or via location based mechanisms such as global positioning. In other words, the UE may use non-cellular wireless communication in an MCC search. The peer-to-peer communications may be performed via a Wi-Fi or Bluetooth connection with another device, such as another UE. For example, an MCC search may include the UE querying one or more peer UEs to determine the MCC. Additionally, a UE that may have determined the MCC may broadcast the MCC to one or more peer UEs. Thus, an MCC search may include the UE receiving a broadcasted peer-to-peer communication that includes the MCC. The querying and broadcasting may be via a Wi-Fi peer-to-peer signaling protocol or a Bluetooth peer-to-peer signaling protocol, among other types of peer-to-peer protocols.

In some embodiments, an MCC search may include a UE determining (or acquiring) the MCC by receiving and decoding an FM radio broadcast signal. An FM radio broadcast signal may include a country prefix in a program identification (PI) parameter of an FM radio broadcast information message and the PI may be mapped via a mapping table to a corresponding MCC. Thus, the UE may use the PI and mapping table to determine the MCC. The mapping table may be stored locally on the UE or at a network server. Additionally, the mapping table may be over the air (OTA) updateable.

In some embodiments, an MCC search may include a UE determining (or acquiring) the MCC based on the location of the UE. For example, the UE may use a pre-harvested database to map a location of the UE to a corresponding MCC(s). The database may be stored locally on the UE or at a network server. Additionally, the database may be OTA updateable.

Note that all of the above described embodiments may be combined in any combination. In other words, the UE may perform any combination of the above procedures in parallel, in sequence, or in an interleaved manner. For example, a UE may perform a RAT based search for an MCC while concurrently performing a band based search for the MCC. Additionally, the UE may initiate peer-to-peer communications, initiate procedures to determine location of the UE, and attempt to receive an FM radio broadcast transmission during the RAT and band based searches. Alternatively, a UE may prioritize searches and may perform various search types based on the priority.

Note further that a UE may terminate MCC searches based on detection of the MCC from any resource as described above and/or when one or more criteria are met (e.g., a specified time has elapsed or a specified number of searches has been performed). Additionally, a UE may combine results of MCC searches to determine a border indication based on the combined results. In other words, a UE may use combined results of MCC searches to further determine whether the UE is near a boarder of one or more countries.

At 506, the UE may detect the MCC, and based on the MCC, may perform a narrowed, or targeted, search to acquire service at 508. In order to determine a scope of the search to acquire service, the UE may compare the MCC to MCCs stored in a data structure on the UE. The data structure may map the MCC to corresponding types of cellular systems, RATs and cellular bands supported in a country corresponding to the MCC. The data structure may be, or include, a database, table, or other form of structure for mapping (or associating) an MCC to corresponding types of cellular systems, RATs and cellular bands. The data structure may be OTA updateable.

For example, a UE that supports multiple modes may target a search to a subset of the supported modes or a single mode based on the MCC. Thus, a multi-mode UE (e.g., a UE that may support both 3GPP and 3GPP2), the multi-mode UE may target a service acquisition search to 3GPP based on the detected MCC corresponding to a geographic region (determined from reference to the data structure) in which there is no 1×/DO system deployed or configured. Similarly, a UE may target a subset of bands and/or RATs supported by the UE based on the detected MCC. In some embodiments, band and/or RAT deployment information for an MCC may be stored at the UE or at a network server and may be OTA updateable. In addition, if the UE determines a border scenario based on the combined results of the MCC determination, the UE may target its service acquisition search based on the border scenario.

Note that if no MCC is detected after a specified time period or if no MCC is detected after the UE has performed a specified portion of an MCC search (i.e., after the UE has performed a specified number of searches), the UE may continue the MCC search or may perform a legacy service acquisition search (i.e., non-targeted service acquisition search) at 510 The UE may perform the legacy service acquisition search using one or more of a most recently used (MRU) list, a registered PLMN (RPLMN) list, or a home PLMN (HPLMN) list.

In one embodiment, a multi-mode UE may provide a user interface (UI) option (setting) to switch international CDMA on or off. Thus, an MCC search may also be based on "International CDMA switch" on a UI setting such as an international CDMA switch. For example, if an international CDMA switch is turned off at the UI and the multi-mode UE determines that the MCC is not a home MCC (i.e., the multi-mode UE is in a roaming condition), the multi-mode UE may skip a CDMA search even if an equivalent preferred roaming list (eqPRL) may indicate that 1x/DO is more preferred and the multi-mode UE may operate in 3GPP only mode. Further, if the international CDMA switch is off, but a border indication determined based on results of MCC searches indicates the multi-mode UE is near a home and neighbor country border, the UE may operate in multi-mode even if a currently camped system is a roaming system so the UE may re-select back to a home system through better system reselection (BSR).

Alternatively, if the international CDMA switch is turned on and the detected MCC indicates the multi-mode UE is roaming, the multi-mode UE may then map the detected MCC to the eqPRL to identify a more preferred system in that location. Note that if the more preferred system is 1x/do, the multi-mode UE may start a targeted service acquisition search on 1x/DO known in the location corresponding to the detected MCC. In addition, if the more preferred system is a 3GPP system, then based on the detected MCC, the multi-mode UE may identify a more preferred PLMN to select. It may be a RPLMN/HPLMN/UPLMN/OPLMN or any other PLMN selection rule to determine a PLMN for the detected MCC.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the UE is configured to:
  determine that the UE does not have cellular service;
  perform one or more searches for a mobile country code (MCC) responsive to said determining the UE does not have cellular service, wherein the one or more searches comprise one or more cellular mode based searches and one or more RAT based searches, wherein to perform the one or more searches, the UE is further configured to perform the one or more cellular mode based searches and the one or more RAT based searches in parallel;
  determine the MCC based on results of the one or more searches; and
  perform a targeted service acquisition search according to a cellular mode based on the MCC, wherein the targeted service acquisition search is based on, and limited by, the MCC, and wherein the targeted service acquisition search comprises at least one radio access technology (RAT) searched and one or more cellular bands searched within the at least one RAT.

2. The UE of claim 1,
wherein the one or more cellular bands searched comprise a subset of cellular bands of the at least one RAT, wherein the subset of cellular bands is based on the MCC.

3. The UE of claim 1,
wherein to perform the one or more cellular mode based searches, the UE is configured to scan for a first signal according to a first cellular mode of one or more cellular modes; and
wherein if the scan is successful, the UE is configured to:
  receive the first signal according to the first cellular mode; and
  decode the MCC according to the first cellular mode.

4. The UE of claim 1,
wherein to perform the one or more RAT based searches, the UE is configured to scan for a first signal according to a first RAT of one or more RATs; and
wherein if the scan is successful, the UE is configured to:
  receive the first signal according to the first RAT; and
  decode the MCC according to the first RAT.

5. The UE of claim 1,
wherein the one or more searches further comprise an FM radio broadcast signal search, wherein to perform the FM radio broadcast signal search, the UE is further configured to:
  receive an FM radio signal;
  decode a first parameter from an FM radio broadcast information message; and
  map the first parameter to the MCC via a mapping table, wherein the mapping table is stored at the UE, and wherein the mapping table is over the air updateable.

6. The UE of claim 1,
wherein the one or more searches further comprise one or more peer-to-peer queries, wherein to perform the one or more peer-to-peer queries, the UE is further configured to:
  send a first query to one or more peer devices via non-cellular wireless communication; and
  receive the MCC via a message from at least one of the one or more peer devices in response to the first query.

7. The UE of claim 1,
wherein the one or more searches further comprise at least one location search, wherein to perform the at least one location search, the UE is further configured to:
determine a location of the UE via wireless communication; and
determine the MCC based on the location via a database stored on the UE, wherein the database is over the air updateable.

8. The UE of claim 1,
wherein the UE is further configured to detect a border condition based on results of the one or more searches, wherein the one or more searches comprise one or more cellular mode based searches, one or more RAT based searches, and at least one location based search; and
wherein the targeted service acquisition search is further based on the border condition.

9. A non-transitory computer accessible memory medium comprising program instructions which, when executed at a wireless user equipment (UE) device, cause the UE to:
determine that the UE does not have cellular service;
perform one or more searches for a mobile country code (MCC) responsive to said determining the UE does not have cellular service, wherein the one or more searches comprise one or more cellular mode based searches and one or more RAT based searches, wherein to perform the one or more searches, the program instructions, when executed by the UE, further cause the UE to interleave the performance of the one or more cellular mode based searches and the one or more RAT based searches;
determine the MCC based on results of the one or more searches; and
perform a targeted service acquisition search according to a cellular mode based on the MCC, wherein the targeted service acquisition search is based on, and limited by, the MCC, and wherein the targeted service acquisition search comprises at least one radio access technology (RAT) searched and one or more cellular bands searched within the at least one RAT.

10. The non-transitory computer accessible memory medium of claim 9,
wherein to perform the one or more cellular mode based searches, the program instructions, when executed by the UE, further cause the UE to scan for a first signal according to a first cellular mode of one or more cellular modes; and
wherein if the scan is successful, program instructions, when executed by the UE device, further cause the UE to:
receive the first signal according to the first cellular mode; and
decode the MCC according to the first cellular mode.

11. The non-transitory computer accessible memory medium of claim 9,
wherein to perform the one or more RAT based searches, the program instructions, when executed by the UE device, further cause the UE to scan for a first signal according to a first RAT of one or more RATs; and
wherein if the scan is successful, program instructions, when executed by the UE device, further cause the UE to:
receive the first signal according to the first RAT; and
decode the MCC according to the first RAT.

12. The non-transitory computer accessible memory medium of claim 9,
wherein the one or more searches further comprise an FM radio broadcast signal search, wherein to perform the FM radio broadcast signal search, the program instructions, when executed by the UE device, further cause the UE to:
receive an FM radio signal;
decode a first parameter from an FM radio broadcast information message; and
map the first parameter to the MCC via a mapping table, wherein the mapping table is stored at the UE, and wherein the mapping table is over the air updateable.

13. The non-transitory computer accessible memory medium of claim 9,
wherein the one or more searches further comprise one or more peer-to-peer queries, wherein to perform the one or more peer-to-peer queries, the program instructions, when executed by the UE device, further cause the UE to:
send a first query to one or more peer devices via non-cellular wireless communication; and
receive the MCC via a message from at least one of the one or more peer devices in response to the first query.

14. The non-transitory computer accessible memory medium of claim 9,
wherein the program instructions, when executed by the UE device, further cause the UE to detect a border condition based on results of the one or more searches, wherein the one or more searches comprise one or more cellular mode based searches, one or more RAT based searches, and at least one location based search; and
wherein the targeted service acquisition search is further based on the border condition.

15. The non-transitory computer accessible memory medium of claim 9,
wherein the one or more cellular bands searched comprise a subset of cellular bands of the at least one RAT, wherein the subset of cellular bands is based on the MCC.

16. A method for operating a wireless user equipment (UE) device, the method comprising:
by a UE,
determining that the UE does not have cellular service;
performing one or more searches for a mobile country code (MCC) responsive to said determining the UE does not have cellular service, wherein the one or more searches comprise one or more cellular mode based searches and one or more RAT based searches, wherein performing the one or more searches comprises performing the one or more cellular mode based searches and the one or more RAT based searches in parallel;
determining the MCC based on results of the one or more searches; and
performing a targeted service acquisition search according to a cellular mode based on the MCC, wherein the targeted service acquisition search is based on, and limited by, the MCC, and wherein the targeted service acquisition search comprises at least one radio access technology (RAT) searched and one or more cellular bands searched within the at least one RAT.

17. The method of claim 16, wherein to perform the one or more cellular mode based searches, the method further comprises the UE scanning for a first signal according to a first cellular mode of one or more cellular modes; and wherein if the scanning is successful, the method further comprises the UE:

receiving the first signal according to the first cellular mode; and decoding the MCC according to the first cellular mode.

18. The method of claim 16, wherein to perform the one or more RAT based searches, the method further comprises the UE scanning for a first signal according to a first RAT of one or more RATs; and wherein if the scanning is successful, the method further comprises the UE:

receiving the first signal according to the first RAT; and decoding the MCC according to the first RAT.

19. The method of claim 16, wherein the one or more searches further comprise an FM radio broadcast signal search, wherein to perform the FM radio broadcast signal search, the method further comprises the UE:

receiving an FM radio signal;

decoding a first parameter from an FM radio broadcast information message; and mapping the first parameter to the MCC via a mapping table, wherein the mapping table is stored at the UE, and wherein the mapping table is over the air updateable.

20. The method of claim 16, wherein the one or more searches further comprise one or more peer-to-peer queries, wherein to perform the one or more peer-to-peer queries, the method further comprises the UE:

sending a first query to one or more peer devices via non-cellular wireless communication; and receiving the MCC via a message from at least one of the one or more peer devices in response to the first query.

* * * * *